United States Patent
Eckert et al.

(10) Patent No.: US 6,745,046 B1
(45) Date of Patent: Jun. 1, 2004

(54) INTEGRATED ANTENNA COUPLER ELEMENT

(75) Inventors: Rainer Eckert, Munich (DE); Helmut Fuenfgelder, Dietersheim (DE); Thomas Moliere, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/890,628

(22) PCT Filed: Feb. 1, 2000

(86) PCT No.: PCT/DE00/00290
§ 371 (c)(1),
(2), (4) Date: Aug. 3, 2001

(87) PCT Pub. No.: WO00/46931
PCT Pub. Date: Aug. 10, 2000

(30) Foreign Application Priority Data

Feb. 3, 1999 (DE) .......................... 199 04 343

(51) Int. Cl.⁷ .............................................. H04M 1/00
(52) U.S. Cl. .................. 455/552.1; 455/553.1; 455/180.1; 343/702; 343/709
(58) Field of Search ................... 455/553, 301, 455/188.1, 180.1, 552, 179.1, 115, 126; 330/129, 135, 136; 343/702, 709

(56) References Cited

U.S. PATENT DOCUMENTS

| | | | | |
|---|---|---|---|---|
| 5,396,397 A | * | 3/1995 | McClanahan et al. | 361/313 |
| 5,724,003 A | * | 3/1998 | Jensen et al. | 330/129 |
| 5,794,159 A | * | 8/1998 | Portin | 455/553 |
| 5,930,665 A | * | 7/1999 | Cho et al. | 438/612 |
| 5,974,305 A | * | 10/1999 | Matero | 455/188.1 |
| 5,983,081 A | * | 11/1999 | Lehtinen | 455/76 |
| 6,023,251 A | * | 2/2000 | Koo et al. | 343/895 |
| 6,084,920 A | * | 7/2000 | Ferdinandsen | 375/297 |
| 6,108,527 A | * | 8/2000 | Urban et al. | 455/115.3 |
| 6,188,877 B1 | * | 2/2001 | Boesch et al. | 455/74 |
| 6,381,471 B1 | * | 4/2002 | Dvorkin | 455/552.1 |
| 6,609,010 B1 | * | 8/2003 | Dolle et al. | 455/552.1 |
| 6,611,691 B1 | * | 8/2003 | Zhou et al. | 343/709 |

FOREIGN PATENT DOCUMENTS

GB WO97/30523 * 8/1997 ............ H04B/1/40

* cited by examiner

Primary Examiner—William Trost
Assistant Examiner—Danh Le
(74) Attorney, Agent, or Firm—Bell Boyd & Lloyd LLC

(57) ABSTRACT

Integrated antenna coupler element, in particular for a multi-band terminal of a mobile radio system, with an operating voltage connection, an antenna input/output, a transmit signal input, a received signal output, a transmit/receive control signal input, a required transmit power input and a control voltage transmit output stage output.

19 Claims, 1 Drawing Sheet

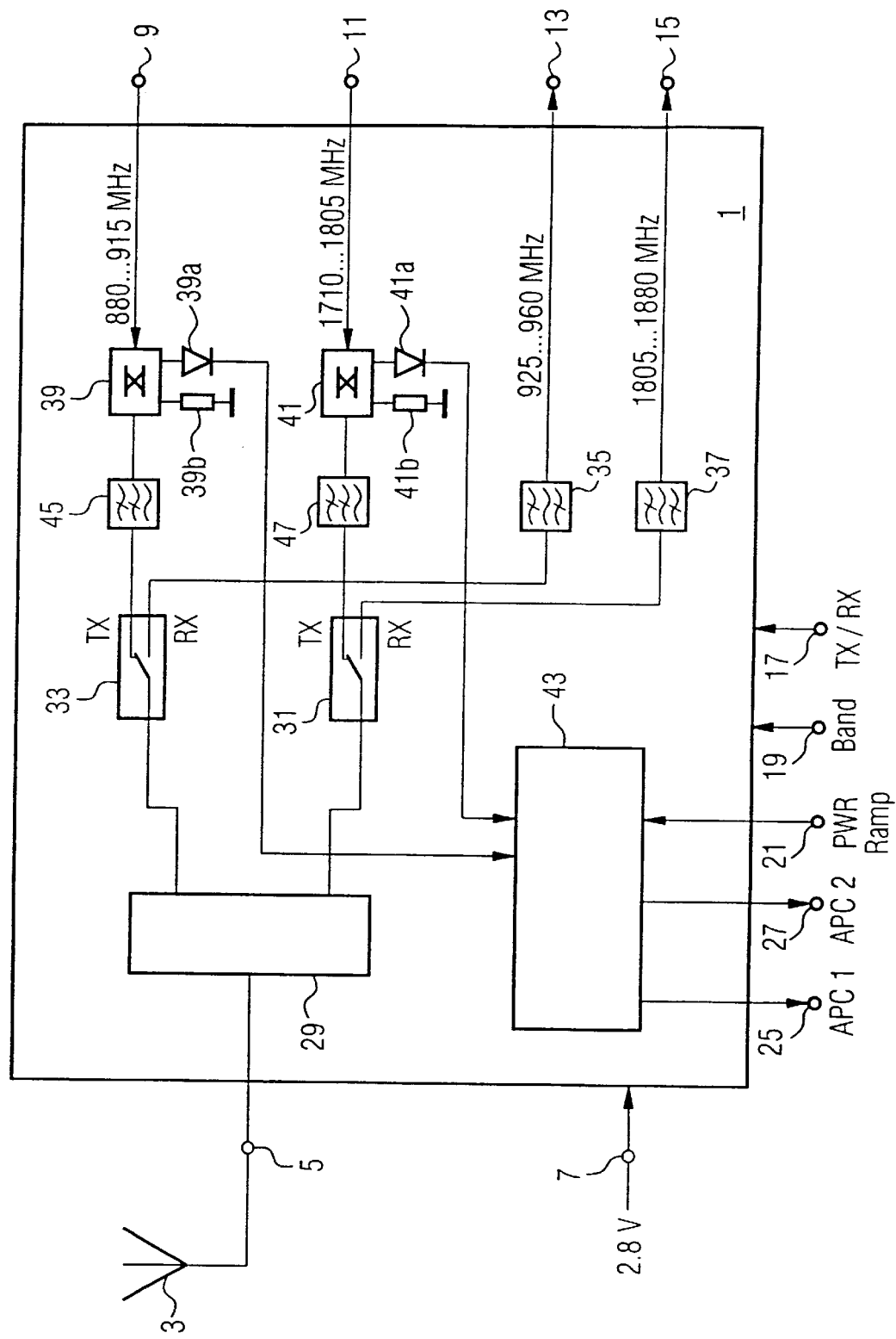

_US 6,745,046 B1_

INTEGRATED ANTENNA COUPLER ELEMENT

BACKGROUND OF THE INVENTION

1. Field of the Invention

The present invention relates to an integrated antenna coupler element, in particular for a multiband terminal of a mobile radio system.

2. Description of the Prior Art

Terminals in communications systems, in particular portable terminals such as mobile radio stations, are currently designed for maximum communications performance with minimum power consumption and are furthermore intended to be used as universally as possible. As such, at least for a specific market segment of such devices, they need to be designed for different transmission standards; particularly different transmission frequency bands.

For reasons of size, weight and cost, a single antenna is normally used in such devices, which then serves as both a receive and a transmit antenna for the frequency ranges for which the terminal is designed. This multiple use of the antenna requires special processing of the received signals and the signals to be transmitted, in order to ensure optimum utilization and interference suppression of the received signals, on the one hand, and minimum power consumption and extensive suppression of noise effects in transmit mode, on the other hand.

This is particularly relevant to terminals which operate in the "conventional" GSM range, i.e. 900 MHz (more precisely: uplink in the 875 to 915 MHz frequency band and downlink in the 920 to 960 MHz frequency band) as well as to terminals which operate in the transmit/receive frequency range around 1800 MHz, often referred to as the PCN or DCS range, since harmonic effects can be particularly critical for such devices due to the approximate frequency ratio of 1:2. This must be taken into account through suitable filtering of the entire received signal, especially in receive mode in the GSM range, and through maximum suppression of the transmission of the first harmonic in GSM transmit mode.

In a dual-band terminal for GSM and DCS (PCN), separate pre-amplifiers for the GSM range and the DCS range, and normally also separate transmit output stages for the GSM and the DCS range, are provided in the receive component. The (entire) received signal from the antenna must be forwarded in the receive or monitor time slot, depending on the selected operating frequency band, either to the GSM pre-amplifier or to the DCS pre-amplifier, whereas the output signal of the GSM or DCS output stage must be fed to the antenna in the transmit time slot.

In receive mode in the GSM band, the antenna signal is fed via an antenna switch (if necessary with a diplexer) to a narrowband filter, in most cases designed as a surface acoustic wave (SAW) filter, through which it passes to be forwarded to the input of the GSM input amplifier (LNA= Low Noise Amplifier). For reception in the DCS band, the antenna signal is likewise fed via an antenna switch (again, if necessary, with a diplexer) to a narrowband DCS receive filter, in most cases designed as a ceramic filter, through which it passes to be forwarded to the input of the DCS-LNA.

In transmit mode in the GSM band, the output signal of the GSM transmit output stage is fed to a coupler element, the extracted subsignal of which serves to control the transmit power via a control loop. The actual transmit signal, after passing through the coupler, is fed to a low-pass filter, through which it passes to be forwarded via an antenna switch (again, if necessary, with a diplexer) to the antenna. In transmit mode in the DCS band, the output signal of the DCS transmit output stage is fed in a similar manner to a (separate) coupler, the extracted subsignal of which again serves to control the transmit power, whereas the actual transmit signal is filtered with a low-pass filter and then fed via an antenna switch (if necessary with a diplexer) to the antenna.

To date, a multiplicity of discrete components have been used to implement these functions, requiring a relatively large amount of space and shielding and assembly outlay.

An object of the present invention, therefore, is to improve the design of a terminal of the aforementioned type in this functional domain in such a way that the space requirement and assembly outlay are reduced.

SUMMARY OF THE INVENTION

The present invention includes the technical instruction indicating a component which implements the complex functions in the antenna input/output coupling domain, which can be manufactured, encapsulated and shielded as a whole at low cost on the basis of a homogeneous technological concept, and which is assembled in one assembly operation. Along with an operating voltage connection, this component has a signal input/output for connection to the antenna, at least one signal input for connection to the transmit output stage(s), at least one received signal output for connection to the receive stage(s) and at least two control signal inputs for changeover between transmit and receive mode and for the required transmit power, and at least one control signal output for a control voltage which is to be fed to the transmit output stage(s).

In a preferred embodiment of a conventional dual-band terminal, separate transmit signal inputs are provided for a first and second transmit frequency band and/or separate received signal outputs for a first and second receive frequency band and a control signal input for the frequency band selection.

For a terminal in which separate transmit output stages are provided for the two frequency bands, the antenna coupler element also includes separate control voltage outputs for these transmit output stages. In a terminal in which the required values ("PWR Ramp") are defined separately, the antenna coupler element, in a further preferred embodiment, also includes two corresponding control signal inputs.

The antenna coupler element according to the present invention represents the structural unification of at least the functional units of a received signal band-pass filter, a transmit signal low-pass or band-pass filter, a transmit signal directional coupler, a transmit output stage power control loop with temperature compensation and a transmit/receive antenna changeover switch.

Especially in a dual-band terminal, the antenna coupler furthermore implements at least separate received signal band-pass filters for the first and second receive frequency band and/or separate transmit signal low-pass or band-pass filters for the first and second transmit frequency range and/or separate transmit signal directional couplers for the first and second transmit frequency range and/or separate power control stages for two transmit output stages, which generate the transmit signals in the first or second frequency band.

However, both the power control for the output stage(s) and the directional coupler function can be implemented in each case in an individual functional segment of the integrated antenna coupler element. The antenna switch function also can be implemented in a single switch area.

In a technologically preferred embodiment, the antenna coupler element is implemented using what is known as "LTCC" or "multilayer" ceramic technology. The aforementioned specific solutions can be used to implement the individual functional segments.

Some of the functional units, in particular (if such a unit is provided) the diplexer, directional couplers and switching elements, elements of low-pass filters, the transmit output stage power controller and input amplifiers are advantageously implemented via LTCC technology directly in the corresponding ceramic multilayer substrate. This substrate furthermore serves as a motherboard to accommodate further functional units which are not implemented directly in the substrate, in particular the surface wave filter, the RF detector diode and, if necessary, operational amplifier units. Compared with the state of the art, this design produces a considerable cost saving even in the implementation of the individual functions. Additional advantages are created by the integration of additional shielding walls into the LTCC motherboard, effecting EMI shielding of the functional units which are sensitive in this respect not only in relation to one another but also in relation to external interference, and reducing electromagnetic emission. The shielding of the individual functional units and the entire functional complex is thereby substantially simplified and more economically designed.

Additional features and advantages of the present invention are described in, and will be apparent from, the following Detailed Description of the Preferred Embodiments and the Drawings.

DESCRIPTION OF THE DRAWINGS

FIG. 1 shows a functional block diagram of an integrated antenna coupler element for a dual-band mobile telephone in accordance with an embodiment of the present invention.

DETAILED DESCRIPTION OF THE PREFERRED EMBODIMENTS

The integrated antenna coupler element I is connected to a transmit/receive antenna 3 and to the 2.8 V mobile telephone operating voltage and (not shown) to transmit output stages for the GSM and the DCS band and to receive components for these bands.

The connection to the antenna 3 is established via an antenna input/output 5, the connection to the operating voltage is established via an operating voltage connection 7, the connection to the GSM transmit output stage, which provides a transmit signal in the 880 to 915 MHz frequency range, is established via a first transmit signal input 9, the connection to the DCS transmit output stage, which provides a transmit signal in the 1710 to 1805 MHz frequency range, is established via a second transmit signal input 11, the connection to the GSM receive stage, to which a received signal in the 925 to 960 MHz frequency band is fed, is established via a first received signal output 13, and the connection to the DCS receive stage, to which a received signal in the 1805 to 1880 MHz frequency band is fed, is established via a second received signal output 15.

A changeover signal "TX/RX" for transmit/receive operating mode changeover is received by the antenna coupler element 1 via an operating mode control input 17 and a frequency band selection signal "Band" via a band selection control input 19, and a control signal for the required operating condition of the transmit output stages (which is jointly defined in this example) "PWR Ramp" via an output stage operation control signal input 21. A first analog transmit power control voltage output 25 is provided to output a first control voltage "APC 1" for the GSM transmit output stage, and a second transmit power control voltage output 27 is provided to supply the control voltage "APC 2" for the transmit power of the DCS transmit output stage.

A so-called diplexer functional area 29 is connected to the antenna input/output 5 in accordance with the selected transmit/receive operating mode at the input or output side and is connected to two antenna changeover areas 31 and 33 in accordance with the defined operating mode on the output or input side. Herein, in response to the control signal "TX" or "RX" supplied via the input 17, either first the transmit signal (further processed in the manner described below) or one of the transmit output stages is supplied or the received signal of the GSM or DCS mode is forwarded to the diplexer 29. In the switch position "RX" of the antenna changeover switch areas 31, 33, the received signal (depending on the control signal "Band" received via the input 19) is fed to a band-pass filter 25 designed as a surface acoustic wave filter for the GSM range or a band-pass filter 37 designed as an SAW or ceramic filter for the DCS range, from which the correspondingly filtered signals are forwarded to the output 13 or 15.

The transmit signal fed via the input 9 or 11 is initially fed to a first directional coupler area 39 provided with a termination 50 for the reflected wave for the GSM transmit signal or a second directional coupler area 41 for the DCS transmit signal. In the directional couplers 39, 41, a small part of the transmit power is tapped via an RF detector diode 39a or 41a and fed as an (internal) actual value control signal for the current transmit power to a transmit output stage power controller segment 43 with temperature compensation, which is furthermore connected to the aforementioned input 21 and outputs 25 and 27. The end-of-line resistors are indicated in FIG. 1 as 39b and 41b. The mode of operation and structure of this power controller segment correspond, apart from the special technological implementation in LTCC technology, to known mobile radio power controller circuits and are, therefore, not further explained. The main part of the transmit power is fed at the output of the directional couplers 39 and 41 to a low-pass filter segment 45 for the GSM range and to a low-pass filter segment 47 for the DCS range. From there, the transmit signals are forwarded to the aforementioned antenna changeover switch areas 31, 33 and finally via the diplexer 29 and the antenna connection 5 to the antenna 3.

The antenna coupler element described above with reference to its inputs, outputs and functional areas is technologically advantageous in or on a multilayer substrate having a number of glass-ceramic layers ($Al_2O_3$—$SiO_2$—$B_2O_3$—CaO) using LTCC (Low Temperature Co-Fired Ceramics) technology. In order to implement the proposed integrated antenna coupler element, the LTCC technology is preferably combined with other modern assembly technologies such as the so-called "Chip&Wire" or "Flip-Chip" technology, wherein some of the functional components described above (depending on the specific embodiment, in particular the diplexer functional area 29, the directional coupler areas 39 and 41, at least areas of the low-pass filter segments 45 and 47 and the transmit output stage power controller segment 43) are formed directly in the multilayer substrate with the formation of shielding partition segments. Further functional units, such as the RF detector diodes 39a and 41a and the GSM band-pass filter 25, are discretely soldered directly onto the glass-ceramic substrate. The completely assembled antenna coupler element is finally also provided with an external shield which, due to the shields already implemented in the substrate for critical functional areas, can be designed in a comparably simple and inexpensive manner, in particular as a simple metal cover or metallized hood.

The design of the present invention is not restricted to the described preferred embodiment but, particularly in adaptation to the performance scope of the special terminal and the specific realization of the transmitter and receiver stages, multiform variations are possible.

Thus, the reflected wave can also be used for RF detection.

The proposed integrated antenna coupler element can be used not only in a GSM/DCS dual-band mobile telephone, but also, for example, in a different multiband device; e.g., a GSM/UMTS dual-band device or a triple-band device according to the GSM, DCSD and UMTS standards, or a mobile station designed as a combined mobile telephony and cordless telephony terminal. Even in a single-band mobile telephone or cordless telephone, the solution according to the present invention already offers considerable advantages in terms of function-related packing density and assembly cost.

Although the present invention has been described with reference to specific embodiments, those of skill in the art will recognize that changes may be made thereto without departing from the spirit and scope of the invention as set forth in hereafter appended claims.

We claim:

1. An integrated antenna coupler element for a multiband terminal of a mobile radio system, comprising:
    an operating voltage connection;
    at least one antenna input/output;
    at least one transmit signal input;
    at least one received signal output;
    a transmit/receive control signal input;
    at least one transmit power input; and
    at least one control voltage transmit output stage output.

2. An integrated antenna coupler element for a multiband terminal of a mobile radio system as claimed in claim 1, further comprising:
    separate transmit signal inputs as the at least one transmit signal input for a first and a second transmit frequency band; and
    a frequency band selection control signal input optionally combined with the transmit/receive control signal input.

3. An integrated antenna coupler element for a multiband terminal of a mobile radio system as claimed in claim 1, further comprising:
    separate received signal outputs as the at least one received signal output for a first and a second receive frequency band; and
    a frequency band selection control signal input optionally combined with the transmit/receive control signal input.

4. An integrated antenna coupler element for a multiband terminal of mobile radio system as claimed in claim 2, further comprising:
    separate control voltage outputs as the at least one control voltage transmit output stage output for a first and a second transmit output stage which operate in one of the first and the second transmit frequency bands.

5. An integrated antenna coupler element for a multiband terminal of a mobile radio system as claimed in claim 4, further comprising:
    separate transmit power inputs as the at least one transmit power input for the first and the second transmit output stage.

6. An integrated antenna coupler element for a multiband terminal of a mobile radio system as claimed in claim 1, further comprising functional areas of:
    at least one received signal band-pass filter;
    at least one of a transmit signal low-pass filter and a transmit signal band-pass filter;
    at least one transmit signal directional coupler;
    at least one transmit/receive antenna changeover switch; and
    at least one transmit output stage power controller with temperature compensation and a detector device.

7. An integrated antenna coupler element for a multiband terminal of a mobile radio system as claimed in claim 6, further comprising:
    separate received signal band-pass filters as the at least one received signal band-pass filter for the first and second receive frequency band.

8. An integrated antenna coupler element for a multiband terminal of a mobile radio system as claimed in claim 7, further comprising:
    a diplexer connected to the antenna input/output; and
    two antenna changeover switches for the first and the second received signal frequency band connected downstream of the diplexer in a received signal flow direction.

9. An antenna coupler element for a multiband terminal of a mobile radio system as claimed in claim 6, further comprising:
    one of separate transmit signal low-pass filters and separate transmit signal band-pass filters as the at least one of the transmit signal low-pass filter and the transmit signal band-pass filter for a first and a second transmit frequency band.

10. An integrated antenna coupler element for a multiband terminal of a mobile radio system as claimed in claim 9, further comprising:
    a diplexer connected to the antenna input/output; and
    two antenna changeover switches for a first and a second received signal frequency band connected downstream of the diplexer in a received signal flow direction.

11. An antenna coupler element for a multiband terminal of a mobile radio system as claimed in claim 6, further comprising:
    separate transmit signal directional couplers as the at least one transmit signal directional coupler for a first and a second transmit frequency band.

12. An integrated antenna coupler element for a multiband terminal of a mobile radio system as claimed in claim 11, further comprising:
    a diplexer connected to the antenna input/output; and
    two antenna changeover switches for a first and a second received signal frequency band connected downstream of the diplexer in a received signal flow direction.

13. An integrated antenna coupler element for a multiband terminal of a mobile radio system as claimed in claim 6, further comprising:

separate power controller segments as the at least one transmit output stage power controller for a first and a second transmit frequency band.

14. An integrated antenna coupler element for a multiband terminal of a mobile radio system as claimed in claim 13, further comprising:
   a diplexer connected to the antenna input/output; and
   two antenna changeover switches for a first and a second received signal frequency band connected downstream of the diplexer in a received signal flow direction.

15. An integrated antenna coupler element for a multiband terminal of a mobile radio system as claimed in claim 6, wherein the at least one transmit signal directional coupler includes a low-impedance end-of-line resistor at an output side, and an RF detector diode connected to an input of the transmit stage power controller.

16. An integrated antenna coupler element for a multiband terminal of a mobile radio system as claimed in claim 15, wherein the RF detector diode detects at least one of the transmitted wave and the reflected wave in a vicinity of the directional coupler.

17. An integrated antenna coupler element for a multiband terminal of a mobile radio system as claimed in claim 6, wherein at least some of the functional areas are formed via LTCC technology directly in a multilayer ceramic substate.

18. An integrated antenna coupler element for a multiband terminal of a mobile radio system as claimed in claim 17, wherein the functional areas not implemented directly in the multilayer ceramic substrate are soldered directly on the multilayer ceramic substrate serving as a printed circuit board.

19. An integrated antenna coupler element for a multiband terminal of a mobile radio system as claimed in claim 17, wherein the multilayer ceramic substrate has shielding walls for EMI shielding of sensitive functional areas.

* * * * *